Sept. 30, 1947.  R. B. WORDEN  2,428,324

STRIPPER REEL

Original Filed March 2, 1944

Inventor
R. B. Worden
By Wilfred E. Lawson
Attorney

Patented Sept. 30, 1947

2,428,324

UNITED STATES PATENT OFFICE 2,428,324

STRIPPER REEL

R B. Worden, Granger, Wash.

Continuation of application Serial No. 524,716, March 2, 1944. This application July 15, 1946, Serial No. 683,623

3 Claims. (Cl. 242—84.4)

1

This invention relates generally to the class of winding and reeling and pertains particularly to fishing accessories.

The principal object of the invention is to provide a line stripper of improved form, designed especially to be attached to the angler's belt though not necessarily confined to such position of use, which permits the angler to wind up and strip off the fishing line with great ease while at the same time lightening the fishing pole, so that the pole may be held for longer periods without tiring the angler, than is possible when using a pole supporting a reel carrying many yards of line, which is often wet.

Another object is to provide a line reel designed to be supported by some means other than the fishing rod, having a fixed conical drum with means revolving around the drum for winding the line thereon, such means being so constructed that the winding may be evenly accomplished by changing the position or angle of the fishing rod.

The invention will be best understood from a consideration of the following description taken in association with the drawing forming a part of this application, with the understanding that minor changes and modifications may be made so long as such changes and modifications do not depart from the salient features of the invention as expressed in the appended claims.

Figure 1:
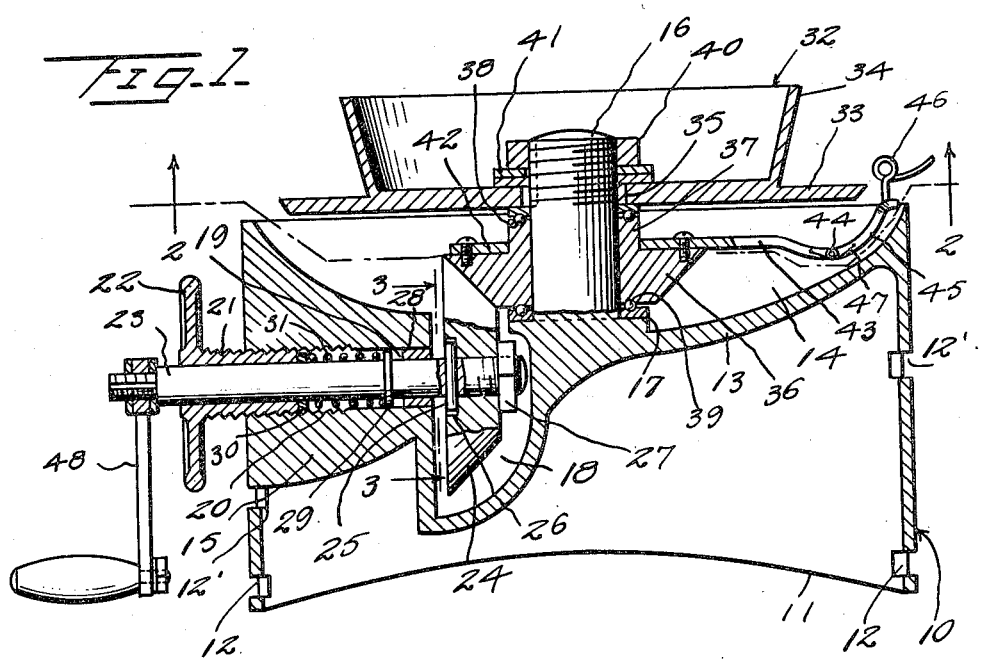
Figure 1 is a view in vertical section through a line stripper constructed in accordance with the present invention.
Figure 2:
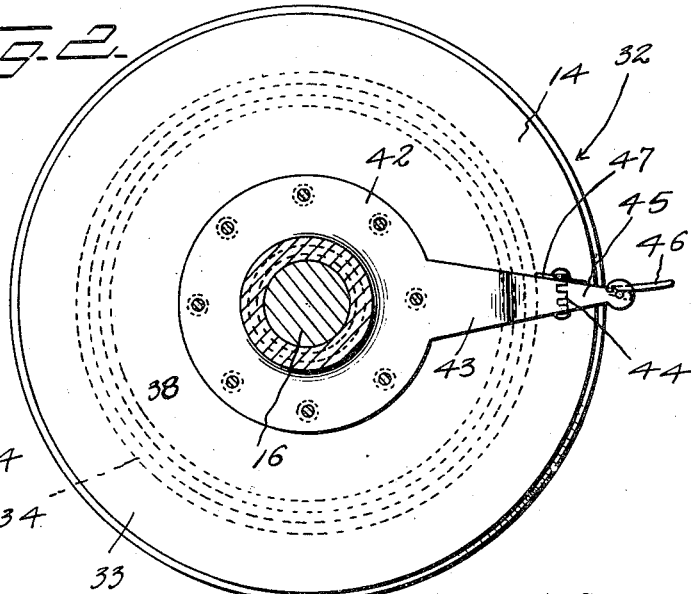
Figure 2 is a horizontal section taken on the line 2—2 of Figure 1.
Figure 3:
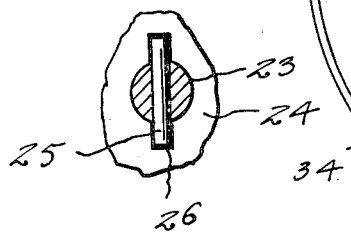
Figure 3 is a sectional view taken on the line 3—3 of Figure 1.

Referring now more particularly to the drawing the numeral 10 designates the body of the device, which may be formed by molding or in any other suitable manner, of a suitable material such, for example, as light metal, plastic or the like.

The body 10 is of circular form and at one end it is shaped to fit against the body as indicated at 11. The body is designed to be held against the body of the fisherman by means of a waist strap, not shown, which may be passed through slots 12 or through the slots 12', the latter slots being formed near the center of the body as illustrated for use with a long strap. A shorter strap would be passed through the slots 12. If desired, short straps might be permanently secured to the body 10 at opposite sides to be fastened around the body of the user of the devices.

2

At the opposite end the body is divided or partitioned by the concave wall 13, which merges at its periphery with the adjacent end edge of the body, thus forming the shallow chamber 14, which opens through the end of the body.

The wall is enlarged at one side of the body as at 15, while at the center of the body there is located the central post 16 which extends, on the axial center of the body beyond the plane of the rim of the open chamber 14, as shown. This post may be molded or formed integral with the wall and at its inner end there is formed the bearing shoulder 17, for the purpose hereinafter stated.

Between the post 16 and the enlarged part 15 of the body, there is formed the recess 18, into which opens one end of a shaft bore 19, which extends radially to the outside of the body.

The wall of the bore 19 is screw threaded as at 20, and has threaded into the outer end the sleeve 21, which carries upon its outer end the wheel or crank means 22.

Through the sleeve 21 passes the shaft 23, which extends from beyond the outer end of the sleeve inwardly into the recess, where it has mounted thereon the beveled friction wheel or clutch wheel 24. A pin 25, passing through the shaft, lies in a slot 26, formed in the back of the wheel to hold the wheel against turning, while the nut 27, threaded on the inner end of the shaft, holds the wheel against shifting lengthwise thereon.

At the inner end of the shaft bore 19, a bearing 28 encircles the shaft and inwardly of this bearing the shaft has fixed thereto the collar 29.

At the inner end of the sleeve 21 is a washer 30, and between this washer and the collar 29 is the coil spring 31, which is compressed against the collar 29, by threading the sleeve inwardly as will be readily apparent.

The numeral 32 generally designates the drum or reel upon which the line is wound. This comprises a circular bottom plate 33 and the integral cone 34 which is in the form of a concentric annular flange which is set in from the edge of the plate and is inclined outwardly as shown. There is thus formed between the cone and the plate an annular V shaped channel in which the line is received. This outwardly sloping cone wall causes the wound line to strip off one coil at a time when a cast is made.

The center of the plate 33 has the aperture 35, to receive the threaded outer end of the post 16, and between the bottom of the plate and the shoulder 17, there is mounted on the post, for rotation therearound, the beveled friction wheel or clutch wheel 36 which has its beveled periphery in frictional contact with the beveled periphery of the wheel 24.

The wheel 36 has the hub 37, extending from the back and between the end edge of the hub and the plate of the line drum is an anti-friction bearing 38, while a corresponding bearing 39 is interposed between the front side of the wheel 36 and the shoulder 17.

Threaded on the outer end of the post 16 is a securing nut 40, between which and the outer side of the drum plate 33 is a lock washer 41. This nut secures the drum firmly against turning, on the post 16.

Encircling the hub 37 of the wheel 36 is an annulus 42, which is secured to the back of the wheel 36 to turn therewith and integral with and extending radially from this annulus is the stripping arm which is moved around the post, in the chamber 14, beneath the drum 32, by the wheel 36, when the latter is rotated.

Hingedly attached, as at 44, to the outer end of the arm 43, is the upwardly curving stripper finger 45, which has its outer end between the periphery of the plate 33, and that of the bowl-like chamber in which the arm moves.

The outer end of the finger carries a line guide eye 46, into which the fishing line, not shown, is inserted to be wound about the drum flange 34.

A spring 47, mounted on the pintle of the hinge 44, and having its ends engaging the arm and finger, constantly urges the finger to swing down away from the drum.

Any suitable means may be employed for rotating the shaft 23, such as the crank 48, and when the shaft is turned, rotary motion will be imparted to the wheels 24 and 36, causing the stripper arm to swing around in the chamber 14, beneath the stationary drum.

The line will thus be carried or wound around the drum flange.

By mounting the line stripper upon his person, an angler frees his rod of a weight which makes prolonged fishing tiresome. In addition, casting may be accomplished with greater ease and freedom and longer casts may be made with light lures, or with the use of lighter weights than is possible when the rod is weighted with a reel containing many yards of line, which may be wet.

Casting may be accomplished, also, without danger of snarling the line and winding may be done smoothly with even winding of the line on the drum, since the position of the pivoted finger can be continuously varied by raising and lowering the fishing pole tip so as to cause the line to pull up or down upon the free end of the stripper finger.

The term "stripper" to define the arm is employed to describe the action which the arm performs. In withdrawing the line from the drum, the pull is applied to the arm which causes the arm to turn around the drum and thus strip the line from the drum instead of pulling the line directly from the drum across the periphery thereof as is done in the use of those types of reels where the reel itself is rotated and the line wound thereon by such rotating action or paid out or fed therefrom by the rotation of the reel.

This application is a continuation of application, Serial No. 524,716, filed March 2, 1944, now abandoned.

I claim:

1. A line guide reel comprising a body having a circular chamber in and opening through one side, a post secured to the body concentric with and in the chamber, an arm connected at one end to the post to turn therearound within the chamber, the arm extending radially in the chamber and having its free end adjacent the periphery thereof, a line drum comprising a circular plate having said post secured to the center thereof, the plate lying substantially within the open side of the chamber and spaced at its periphery from the chamber periphery, and a flange on the side of the plate opposite from the chamber and inwardly spaced from and concentric with the plate periphery to have a line wound thereon, a line guide upon the outer end of the arm and extending across the plate periphery between the latter and the periphery of the chamber, means for turning the arm around the post, the said connecting means between the arm and post comprising a friction wheel mounted on the post for rotation therearound and to which the arm is fixed, and the means for turning the arm comprising a shaft, a crank for turning the shaft and a friction wheel mounted on the shaft and having frictional driving connection with the first wheel.

2. A line guide reel comprising a body having a circular chamber in and opening through one side, a post secured to the body concentric with and in the chamber, an arm connected at one end to the post to turn therearound within the chamber, the arm extending radially in the chamber, and having its free end adjacent the periphery thereof, a line drum comprising a circular plate having said post secured to the center thereof, the plate lying substantially within the open side of the chamber and spaced at its periphery from the chamber periphery, and a flange on the side of the plate opposite from the chamber and inwardly spaced from and concentric with the plate periphery to have a line wound thereon, a line guide upon the outer end of the arm and extending across the plate periphery between the latter and the periphery of the chamber, means for turning the arm around the post, the said connecting means between the arm and post comprising a friction wheel mounted on the post for rotation therearound and to which the arm is fixed, and the means for turning the arm comprising a shaft, a crank for turning the shaft and a friction wheel mounted on the shaft and having frictional driving connection with the first wheel, and means for varying the degree of frictional coupling between the wheels.

3. A line guide reel comprising a body having a circular chamber in and opening through one side, a post secured to the body concentric with and in the chamber, an arm connected at one end to the post to turn therearound within the chamber, the arm extending radially in the chamber and having its free end adjacent the periphery thereof, a line drum comprising a circular plate having said post secured to the center thereof, the plate lying substantially within the open side of the chamber and spaced at its periphery from the chamber periphery, and a flange on the side of the plate opposite from the chamber and inwardly spaced from and concentric with the plate periphery to have a line wound thereon, a line guide upon the outer end of the arm and extending across the plate periphery between the latter and the periphery of the chamber, means for turning the arm around the post, the said connecting means between the arm and post comprising a friction wheel mounted on the post for rotation therearound and to which the arm is fixed, and the means for turning the arm comprising a shaft, a crank for turning the shaft and a friction wheel mounted on the shaft and having frictional driving connection with the first wheel, means for varying the degree of frictional coupling between the wheels comprising a mounting for the shaft permitting axial movement of the shaft to move the wheel carried thereby toward and away from the first wheel, a collar carried by the shaft, a sleeve encircling the shaft and spaced from the collar, the sleeve being threadably coupled with the body for movement relative to the collar, and an expansion spring compressed between the collar and the adjacent end of the sleeve.

R. B. WORDEN.

REFERENCES CITED

The following references are of record in the file of this patent:

FOREIGN PATENTS

| Number | Country | Date |
| --- | --- | --- |
| 487,818 | Great Britain | June 27, 1938 |
| 488,697 | Great Britain | July 12, 1938 |
| 840,575 | France | Apr. 27, 1939 |